(No Model.)

C. L. BROWN.
ANIMAL TRAP.

No. 527,044. Patented Oct. 9, 1894.

Inventor
Clarence L. Brown.

Witnesses
F. Wieser.
J. P. Riley

By his Attorneys.
C. A. Snow & Co.

UNITED STATES PATENT OFFICE.

CLARENCE L. BROWN, OF CANFIELD, OHIO.

ANIMAL-TRAP.

SPECIFICATION forming part of Letters Patent No. 527,044, dated October 9, 1894.

Application filed April 5, 1894. Serial No. 506,487. (No model.)

*To all whom it may concern:*

Be it known that I, CLARENCE L. BROWN, a citizen of the United States, residing at Canfield, in the county of Mahoning and State of Ohio, have invented a new and useful Animal-Trap, of which the following is a specification.

The invention relates to improvements in animal traps.

The object of the present invention is to provide a simple, inexpensive and efficient animal trap, which will not require setting, and which will permit animals to readily enter it, but prevent their exit, and which will not be liable to get out of order.

The invention consists in the construction and novel combination and arrangement of parts hereinafter fully described, illustrated in the accompanying drawings, and pointed out in the claims hereto appended.

Figure 1:
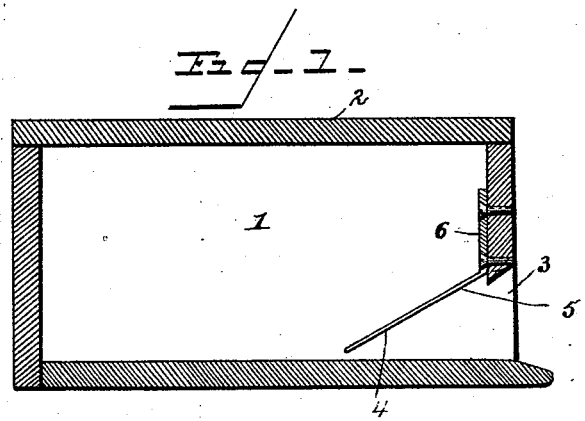
Figure 2:
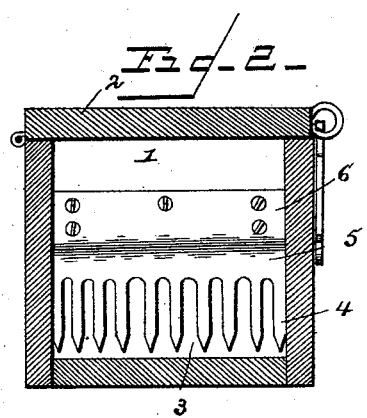
Figure 3:
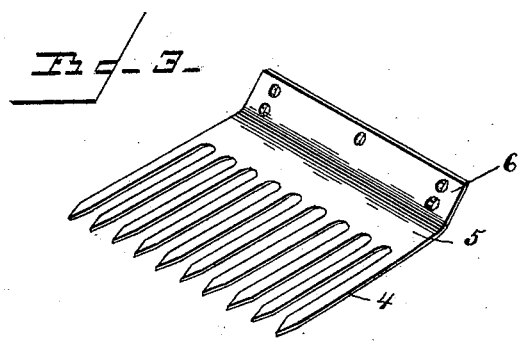

In the drawings—Figure 1 is a longitudinal sectional view of an animal trap, constructed in accordance with this invention. Fig. 2 is a transverse sectional view. Fig. 3 is a detail perspective view of the resilient tines.

Like numerals of reference indicate corresponding parts in all the figures of the drawings.

1 designates a receptacle having a hinged cover or door 2, and provided with a bottom opening 3 forming an entrance to the trap. Above the opening and depending therefrom at an inward inclination are resilient tines 4, arranged at intervals, and terminating in sharp points. The resilient tines are formed integral with a plate 5 arranged at an inclination, and having an integral attachment or securing flange 6, which is perforated for the reception of screws or other fastening devices. The tines and the angularly disposed securing flange are constructed of a single piece of resilient material, preferably sheet metal, and it will be apparent that the trap thus formed is exceedingly economic in its construction.

The receptacle is adapted to be baited by a morsel or some substance having a flavor adapted to attract the animals to be trapped. The points of the tines are located sufficiently above the bottom of the trap, and their resiliency permits them to be readily forced upward by a slight pressure to permit the entrance of an animal. After an animal has once passed any portion of its body beyond the points of the tines, it is impossible for it to recede as such an action will force the points into its flesh, and will thereby compel it to move forward and completely enter the trap without injury to it, and the capture of one animal will serve to attract other similar animals.

It will be seen that the trap is exceedingly simple and inexpensive in construction, that the tines may be readily manufactured, and that any form of receptacle may be conveniently used. It will also be apparent that the trap is positive and reliable in its operation, that it requires no setting, and that there are no parts which will readily get out of order.

Changes in the form, proportion and the minor details of construction may be resorted to without departing from the principle or sacrificing any of the advantages of this invention.

What I claim is—

1. A trap, comprising a receptacle provided with an entrance opening, and a plate secured to the inner face of the receptacle and located above the entrance opening, and provided with a series of downwardly and inwardly inclined tines formed integral with the plate and being resilient, whereby they may be bent upward to permit the inward passage of an animal, substantially as described.

2. A trap comprising a receptacle having an entrance opening, and a series of downwardly inclined resilient tines arranged within the receptacle adjacent to the entrance opening and constructed of a single piece of sheet metal and provided with a flange rigidly secured to the receptacle, substantially as described.

In testimony that I claim the foregoing as my own I have hereto affixed my signature in the presence of two witnesses.

CLARENCE L. BROWN.

Witnesses:
J. W. CANFIELD,
COLDEN CANFIELD.